United States Patent
Oldach et al.

(10) Patent No.: US 8,233,608 B2
(45) Date of Patent: Jul. 31, 2012

(54) METHOD OF AND SYSTEM FOR AUTOMATICALLY SWITCHING BETWEEN FREE DIRECTORY ASSISTANCE SERVICE AND CHARGEABLE DIRECTORY ASSISTANCE SERVICE

(75) Inventors: Richard J. Oldach, Hopkinton, MA (US); Michael Pellegrino, Whitehouse Station, NJ (US); Dwight E. Scott, Buena Park, CA (US); Robert C. Detrie, Penfield, NY (US)

(73) Assignee: Volt Delta Resources LLC, Orange, CA (US)

( * ) Notice: Subject to any disclaimer, the term of this patent is extended or adjusted under 35 U.S.C. 154(b) by 903 days.

(21) Appl. No.: 12/257,454

(22) Filed: Oct. 24, 2008

(65) Prior Publication Data

US 2009/0136018 A1 May 28, 2009

Related U.S. Application Data

(60) Provisional application No. 60/983,897, filed on Oct. 30, 2007.

(51) Int. Cl.
*H04M 3/42* (2006.01)
*H04M 15/00* (2006.01)

(52) U.S. Cl. ......... 379/218.01; 379/114.21; 379/211.02; 379/212.01

(58) Field of Classification Search ............. 379/218.01, 379/114.2, 114.21, 111, 114.23, 114.22, 379/211.02, 212.01
See application file for complete search history.

(56) References Cited

U.S. PATENT DOCUMENTS

| | | | |
|---|---|---|---|
| 4,053,949 A | 10/1977 | Recca et al. | |
| 4,850,007 A | 7/1989 | Marino et al. | |
| 5,339,352 A | 8/1994 | Armstrong et al. | |
| 5,852,775 A | 12/1998 | Hidary | |
| 6,381,325 B1 * | 4/2002 | Hanson | 379/218.01 |
| 6,853,714 B2 | 2/2005 | Liljestrand et al. | |
| 6,907,119 B2 | 6/2005 | Case et al. | |
| 6,934,684 B2 | 8/2005 | Alpdemir et al. | |
| 6,999,563 B1 | 2/2006 | Thorpe et al. | |
| 7,212,615 B2 | 5/2007 | Wolmuth | |
| 7,881,451 B2 | 2/2011 | Chang | |
| 7,933,388 B1 | 4/2011 | Vanier et al. | |
| 2002/0114437 A1 | 8/2002 | Nabkel et al. | |
| 2003/0223563 A1 | 12/2003 | Wolmuth | |
| 2004/0010518 A1 | 1/2004 | Montemer | |
| 2004/0091093 A1 | 5/2004 | Bookstaff | |
| 2004/0196966 A1 | 10/2004 | Bushnell | |
| 2004/0240646 A1 * | 12/2004 | O'Donnell | 379/114.2 |
| 2005/0100153 A1 | 5/2005 | Pines et al. | |

(Continued)

OTHER PUBLICATIONS

Young, Lee W. International Search Report for PCT/US07/80056 as mailed Jan. 28, 2008, (3 pages).

(Continued)

*Primary Examiner* — Thjuan K Addy
(74) *Attorney, Agent, or Firm* — Winstead PC

(57) ABSTRACT

A method of redirecting a directory-assistance call includes receiving a directory-assistance request from a caller, determining via a free directory-assistance service whether information corresponding to the directory-assistance request is available, responsive to a determination that the information is available, presenting, to the caller, the information free of charge to the caller and, responsive to a determination that the information is not available, redirecting the directory-assistance call to a chargeable directory-assistance service.

29 Claims, 9 Drawing Sheets

U.S. PATENT DOCUMENTS

2005/0265539 A1  12/2005  Creamer et al.
2006/0093120 A1   5/2006  Thorpe et al.
2006/0171520 A1   8/2006  Kliger
2006/0173915 A1   8/2006  Kliger
2007/0129054 A1   6/2007  Andronikov et al.
2008/0086375 A1   4/2008  Steck et al.
2010/0312640 A1  12/2010  Haldeman et al.

OTHER PUBLICATIONS

Copenheaver, Blaine R., "International Search Report" for PCT/US2008/012255 as mailed Jan. 9, 2009. (3 pages).

Jakobson, "Coupons on the Go", Incentive, Feb. 2005, Vo;. 179, Iss 2, pp. 1-2.

* cited by examiner

METHOD OF AND SYSTEM FOR AUTOMATICALLY SWITCHING BETWEEN FREE DIRECTORY ASSISTANCE SERVICE AND CHARGEABLE DIRECTORY ASSISTANCE SERVICE

CROSS-REFERENCE TO RELATED APPLICATIONS

This patent application claims priority from, and incorporates by reference the entire disclosure of, U.S. Provisional Patent Application No. 60/983,897, filed Oct. 30, 2007. This patent application incorporates by reference the entire disclosure of U.S. patent application Ser. No. 11/862,995, filed on Sep. 27, 2007.

BACKGROUND

1. Technical Field

The present invention relates in general to the field of directory assistance and, in particular, to automatically redirecting a directory-assistance call between a free directory-assistance service and a chargeable directory-assistance service.

2. History Of Related Art

Directory assistance has existed virtually since the onset of the public switched telephone system. As telephone networks grew in complexity, increased demand for directory-assistance followed and automation became necessary to control costs associated with providing listing information to callers. Many of these services are automated and implemented through automated prompting and speech recognition systems known in the art. Hardware and software are typically utilized to recognize names and numbers spoken by a requesting caller.

For example, in a typical free directory assistance call in the United States, a caller dials a specific phone number such as, for example, 1-800-CALLERS for a local exchange area and receives a pre-recorded prompt "Directory assistance: For what city please;" once the city is voiced, there is a prompt: "For what listing;" and in response to the prompt and depending on a response the caller gives, a desired telephone number is announced through a speech-synthesized announcement. However, if the desired telephone number is unlisted or if the caller's response is not recognized by the automated prompting and speech recognition system, the directory assistance system so informs the caller. The caller is required to hang up without being able to obtain the desired telephone number of the listing and must dial a separate number for directory assistance.

The caller is often forced to use other directory-assistance means such as, for example, a directory-assistance service that allows the caller to call a directory-assistance operator and request a telephone number of a listing. The directory-assistance operators manually find listings according to a caller's request. If the requested telephone number is listed, the directory-assistance operator communicates the telephone number of the listing to the caller. Most directory assistance services using a live directory-assistance operator currently charge for the lookup of names, addresses and telephone numbers. This can be costly and many customers find such directory-assistance charges to be excessive.

SUMMARY OF THE INVENTION

A method of redirecting a directory-assistance call. The method includes receiving a directory-assistance request from a caller, determining via a free directory-assistance service whether information corresponding to the directory-assistance request is available, and responsive to a determination that the information is available, presenting, to the caller, the information free of charge to the caller. The method further includes redirecting the directory-assistance call to a chargeable directory-assistance service responsive to a determination that the information is not available.

An article of manufacture for redirecting a directory-assistance call. The article of manufacture includes at least one computer readable medium and processor instructions contained on the at least one computer readable medium. The processor instructions configured to be readable from the at least one computer readable medium by at least one processor and thereby cause the at least one processor to operate as to perform the steps of receiving a directory-assistance request from a caller, determining via a free directory-assistance service whether information corresponding to the directory-assistance request is available, responsive to a determination that the information is available, presenting, to the caller, the information free of charge to the caller, and responsive to a determination that the information is not available, redirecting the directory-assistance call to a chargeable directory-assistance service.

A directory-assistance call redirecting system. The system includes a free directory-assistance system adapted to determine whether information corresponding to a directory-assistance request is available and present, to the caller, the information free of charge to the caller responsive to a determination that the information is available. The system further includes a chargeable operator directory-assistance system interoperably coupled to the free directory-assistance system and adapted to present, to the caller, the information responsive to a determination by the free directory-assistance system that the information is not available.

BRIEF DESCRIPTION OF THE DRAWINGS

A more complete understanding of the method and system of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1A:
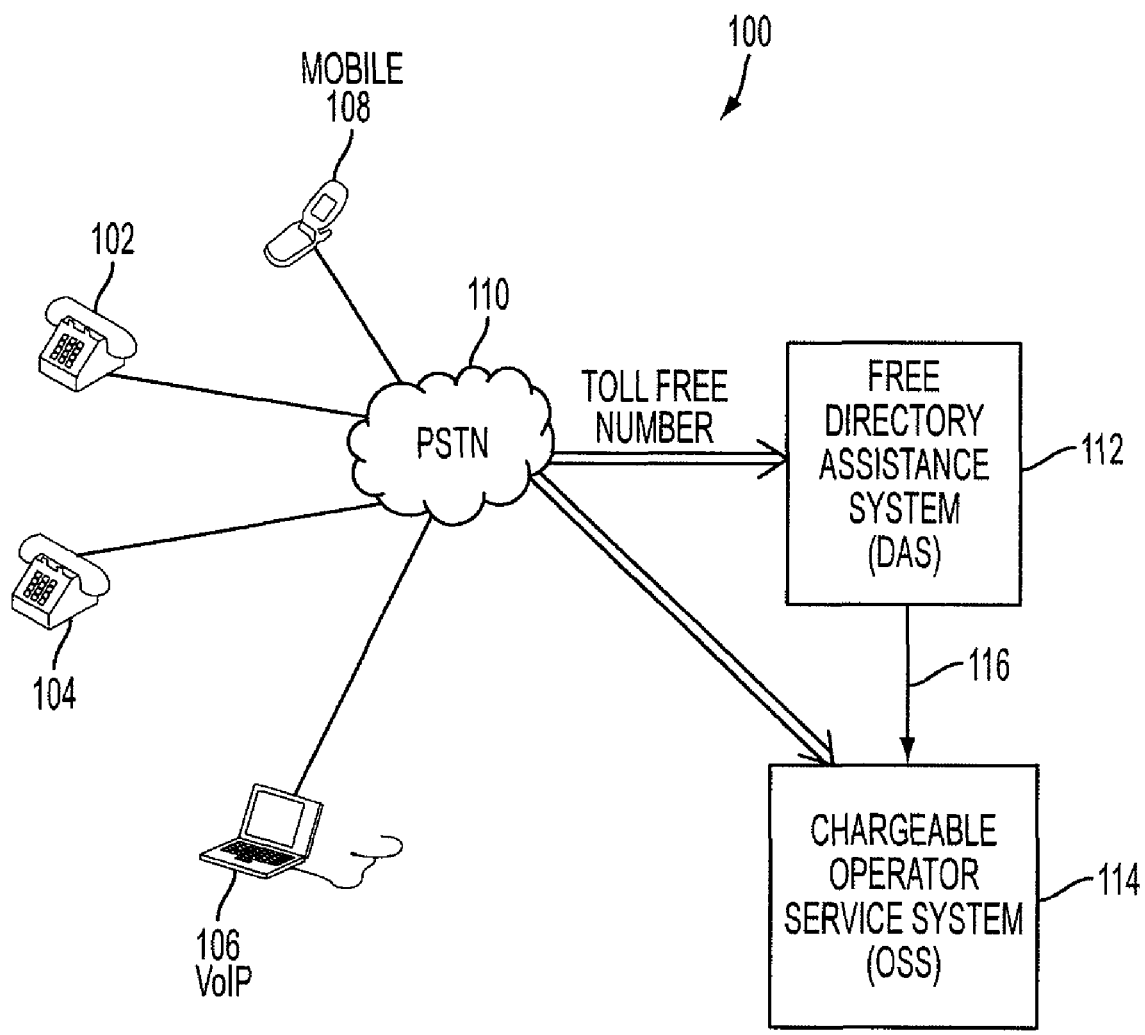
FIG. 1A is a block diagram illustrating a first directory-assistance-based redirecting system.

FIG. 1A shows a block diagram of a directory-assistance based redirecting system 100. A public switched telephone network (PSTN) 110 provides callers associated with communication devices 102, 104, 106, 108 access to a free directory-assistance system (DAS) 112 and a chargeable operator service system (OSS) 114. The communication devices 102, 104, 106, 108 may be, for example, wireline telephones, wireless telephones, personal computers, and the like. Although described in conjunction with the PSTN 110, concepts of the invention are equally applicable to wireless or internet telephony directory-assistance. The free DAS 112 is connected to the chargeable OSS 114 via a data link 116. Callers 102, 104, 106, 108 typically are connected to the free DAS 112 via a telephony interface (shown in FIG. 2).

When a caller associated with a communications device 102, 104, 106, 108 places a call requesting directory assistance, the telephony interface (shown in FIG. 2) routes the call to appropriate circuitry within the free DAS 112. The directory-assistance call may be, for example, a call made to determine a listing. In a typical embodiment, the listing may be, for example, a specific wireline or wireless telephone number and/or address of a residence or business. The directory-assistance call may come from, for example, a wireline telephone, a wireless (cellular) telephone, a VOIP (Internet) telephone, a Satellite telephone, or a personal computer. For example, the caller 102, 104, 106, 108 may reach the free DAS 112 by dialing a specific phone number such as, for example, 1-800-CALLERS. After a connection to the free DAS 112 has been established, the free DAS 112 typically provides marketing information such as, for example, at least one advertisement to the caller 102, 104, 106, 108. The at least one advertisement may be, for example, a recorded announcement of an audible or visual nature. The at least one advertisement presented to the caller 102, 104, 106, 108 is often selected randomly from a plurality of advertisements stored at advertisement servers 226 and 228 (shown in FIG. 2) of the free DAS 112.

Typically, after the at least one advertisement is presented to the caller 102, 104, 106, 108, the free DAS 112 gathers information from the directory-assistance call. The information gathered may be, for example, listing information, caller name, caller phone number, caller location, type of directory assistance required, and any other pertinent information related to the call or the caller 102, 104, 106, 108. In a typical embodiment, at least some of the gathered information may be determined via a variety of means such as, for example, caller ID, calling number area code and exchange code, wireless phone encoded location, and the like.

In order to gather information from the directory-assistance call, the free DAS 112 typically forwards to the caller 102, 104, 106, 108, a pre-recorded prompt such as "Directory assistance: For what city please?" once the city is voiced by the caller 102, 104, 106, 108, there is a prompt such as: "For what listing?" In response to the prompt and depending on the response of the caller 102, 104, 106, 108, the free DAS 112 searches a database within the free DAS 112 for the telephone number of the listing request. If the desired telephone number is recognized by the free DAS 112, the telephone number is announced through a speech synthesized announcement of the free DAS 112 to the caller 102, 104, 106, 108. Prior to announcing the number to the caller 102, 104, 106, 108, the free DAS 112 often provides additional marketing information such as, for example, at least one advertisement to the caller 102, 104, 106, 108. The at least one advertisement may be, for example, a recorded announcement of an audible or visual nature. The advertisements presented to the caller 102, 104, 106, 108 may be selected in an intelligent manner from a plurality of advertisements by assessing a caller's profile at the free DAS 112. For example, if the caller 102, 104, 106, 108 places a call to the free DAS 112 and is interested in obtaining the telephone number for a pizza restaurant, an advertisement for pizza specials in the caller's locality will likely have a much higher impact on the caller and be received with a much higher level of interest than by someone who is merely watching the evening news and is presented a televised advertisement for a pizza restaurant. The intelligent marketing is achieved by accessing the profile for the caller 102, 104, 106, 108 stored at the free DAS 112. The advertisements may be presented to the caller 102, 104, 106, 108 via, for example, a recorded announcement, a text message, an e-mail message, an SMS message, or any other suitable means.

However, if the desired telephone number corresponding to the listing request is unlisted or if the caller's response is not recognized by the automated prompting and speech recognition system of the free DAS 112, the free DAS 112 informs the caller that the listing request is not recognized or the desired telephone number corresponding to the listing request is unavailable. The free DAS 112 is automated and typically does not employ the services of live directory-assistance operators to handle the listing, for example, if the desired telephone number is unlisted or if the caller's response is not recognized by the automated prompting and speech recognition system of the free DAS 112. In a typical system, the caller 102, 104, 106, 108 hangs up without being able to obtain the desired telephone number of the listing and must dial a separate number to obtain further directory assistance.

In a typical embodiment, if the free DAS 112 is unable to provide the desired telephone number or other predefined requested information of the listing request to the caller 102, 104, 106, 108, the free DAS 112 provides a pre-recorded prompt to the caller 102, 104, 106, 108 such as, for example, "Would you like to be transferred to a chargeable directory assistance system?" If the caller's response is negative, the free DAS 112 terminates the call. However, if the caller's response is positive, the free DAS 112 automatically redirects the directory-assistance call to a chargeable directory-assistance service such as, for example, the chargeable operator service system (OSS) 114. The chargeable OSS 114 may be, for example, a directory-assistance service utilizing live directory-assistance operators. In a typical embodiment, the directory-assistance call may be redirected between the free DAS 112 and the chargeable OSS 114 via, for example, a release link transfer method. The information gathered by the free DAS 112 is processed within the free DAS 112 and forwarded to the chargeable OSS 114 via the data link 116. The data transmission between the free DAS 112 and the chargeable OSS 114 typically occurs in real-time or near real-time.

Figure 1B:
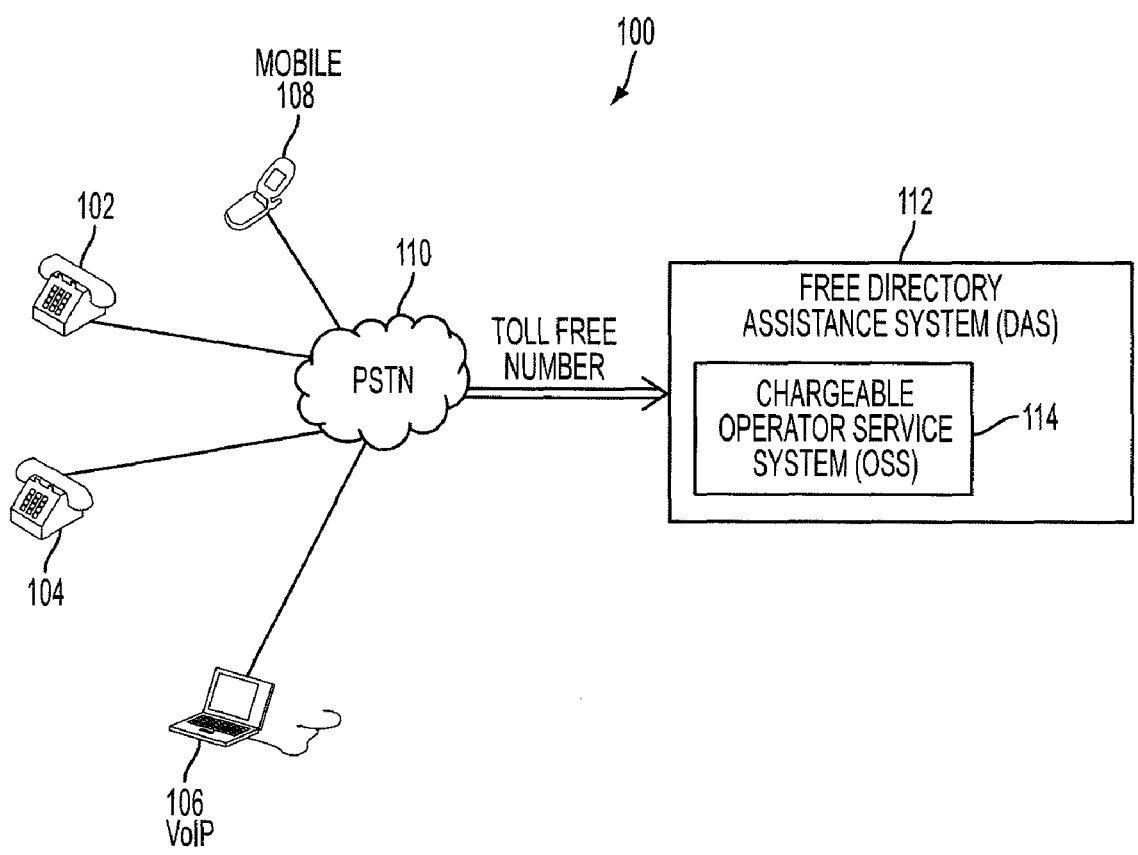
FIG. 1B is a block diagram illustrating a second directory-assistance-based redirecting system.

FIG. 1B shows a block diagram of a second directory-assistance based redirecting system 100. As shown, in this embodiment, the chargeable OSS 114 is integrated into the free DAS 112 of the directory-assistance based redirecting system 100.

Figure 2:
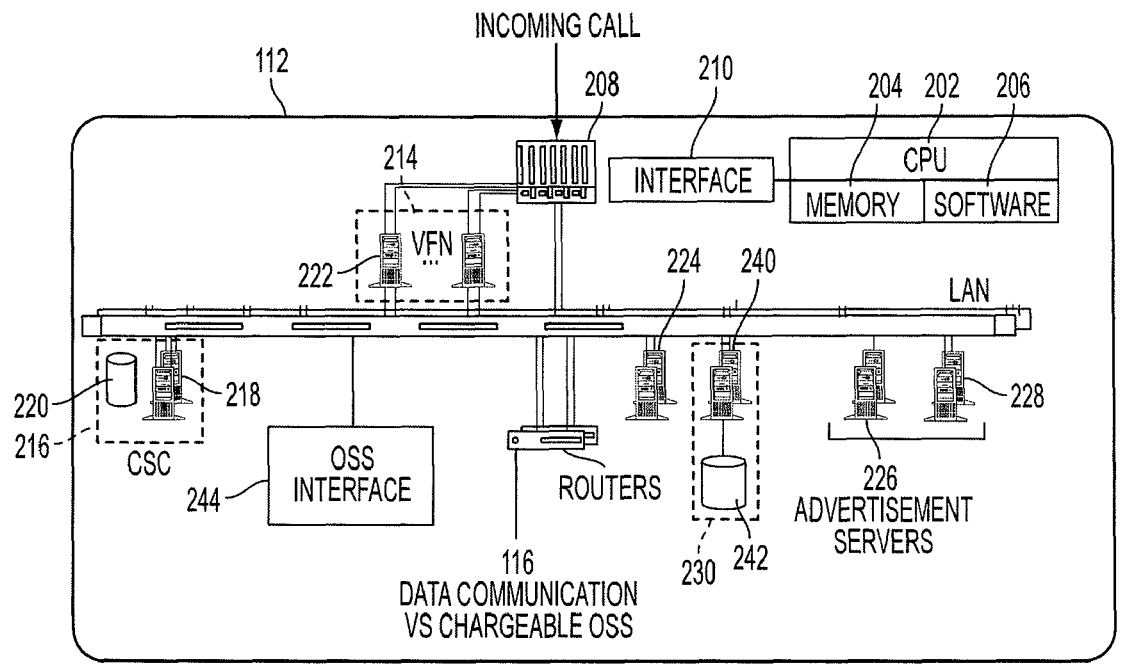
FIG. 2 is a block diagram illustrating a free directory-assistance system.

FIG. 2 is a block diagram of the free directory-assistance system (DAS) 112. The free DAS 112 includes a central processing unit (CPU) 202 having memory 204 with software 206 to control operation of the free DAS 112. The CPU 202 is typically associated with a network interface 210 for communication over, for example, a packet-switched network with systems such as, for example, the chargeable OSS 114. The free DAS 112 further includes a telephony interface 208, which may be, for example, a switch. The telephony interface 208 is adapted to interact with the caller 102, 104, 106, 108 over a telephonic connection. The CPU 202 may include or be associated with necessary hardware and software to provide greetings to the caller 102, 104, 106, 108, ask the caller 102, 104, 106, 108 for desired listings and locality, and store and forward the caller's response. The CPU 202 and the software 206 are configured to facilitate free directory-assistance operations by interacting with components within the free DAS 112.

The free DAS 112 further includes call screening circuitry (CSC) 216 and a voice feature node (VFN) 214. The CSC 216 includes at least one server 218 and at least one database 220. The CSC 216 is adapted to determine attributes of a call. In various embodiments, the database 220 may be implemented using, for example, Oracle™, MS Access™ databases, MS SQL, IBM DB2, and the like. For exemplary purposes, only one server 218 and one database 220 are shown; however, any number of servers and databases may be present within the CSC 216 as needed. The call attributes may include, for example, telephone number of the caller, name of the caller, location of the caller, time of the directory-assistance call, and the like.

The VFN 214 includes a plurality of servers 222, 224. The VFN 214 receives the call attributes from the CSC 216 and prompts the caller 102, 104, 106, 108 for the listing request. The VFN 214 recognizes the listing request from the caller 102, 104, 106, 108 using, for example, a speech recognition system 224. The speech recognition system 224 recognizes and interprets spoken language from caller 102, 104, 106, 108. In a typical embodiment, the speech recognition system 224 may be implemented as a server running the WINDOWS XP operating system from Microsoft Corporation or other suitable operating systems such as, for example, Unix, Linux, and the like. The speech recognition system 224 may also include special hardware, as known in the art, for assisting in recognizing speech patterns. The speech recognition system 224 may also execute one or more programs specifically designed to implement various functions of embodiments of the present invention. Such programs may be written in any standard programming language such as, for example, C or C++.

The free DAS system 112 includes caller-profile circuitry (CPC) 230. The CPC 230 includes at least one server 240 and at least one database 242. The at least one database 242 is adapted to store profiles for each caller 102, 104, 106, 108. The profiles and historical records associated with the callers are updated every time the caller 102, 104, 106, 108 places a call requesting directory-assistance. The profiles help the free DAS 112 determine what a particular caller 102, 104, 106, 108 is interested in and which advertisement(s) to present to the caller 102, 104, 106, 108. By better assessment of what a particular caller 102, 104, 106, 108 is interested in at the moment, the directory-assistance-based redirecting system 100 targets the caller's scope of interest with advertisements. In various embodiments, the database 242 may be implemented using, for example, Oracle™, MS Access™ databases, MS SQL, IBM DB2, and the like. For exemplary purposes, only one server 240 and one database 242 are shown; however, any number of servers and databases may be present within the CPC 230 as needed.

The free DAS 112 further includes a plurality of advertisement servers 226, 228. The advertisement servers 226, 228 store a plurality of advertisements that may be presented to the caller 102, 104, 106, 108. For example, the advertisements to be presented to the caller 102, 104, 106, 108 may be selected by reviewing the caller's profile at the CPC 230 and the listing request identified by the VFN 214. In some embodiments, the types of advertisements to be presented are controlled to a highly specific degree. For example, if a caller 102, 104, 106, 108 places a call to the free DAS 112 and is interested in obtaining the number for a pizza restaurant, a plurality of advertisements for pizza specials in the caller's locality may be presented.

The free DAS 112 further includes an operator service system (OSS) interface 244 adapted to communicate with the chargeable OSS 114 and automatically redirect a directory-assistance call between the free DAS 112 to a chargeable directory assistance service such, for example, the chargeable OSS 114. In a typical embodiment, if the free DAS 112 is unable to provide the telephone number or other predefined requested information of the listing request to the caller 102, 104, 106, 108, the free DAS 112 presents a pre-recorded prompt to the caller 102, 104, 106, 108 such as "Would you like to be transferred to a chargeable directory assistance system?" If the caller's response is negative, the free DAS 112 terminates the call. However, if the caller's response is positive, the free DAS 112 automatically redirects, via the OSS interface 244, the directory-assistance call to the chargeable OSS 114. In a typical embodiment, the directory-assistance call may be redirected between the free DAS 112 and the chargeable OSS 114 via, for example, a release link transfer method. The chargeable OSS 114 may be, for example, a directory assistance service utilizing live directory-assistance operators. The information gathered by the free DAS 112 is processed within the free DAS 112 and forwarded to the chargeable OSS 114 via the data link 116. In a typical embodiment, the data transmission between the free DAS 112 and the chargeable OSS 114 typically occurs in real-time or near real-time.

Figure 3:
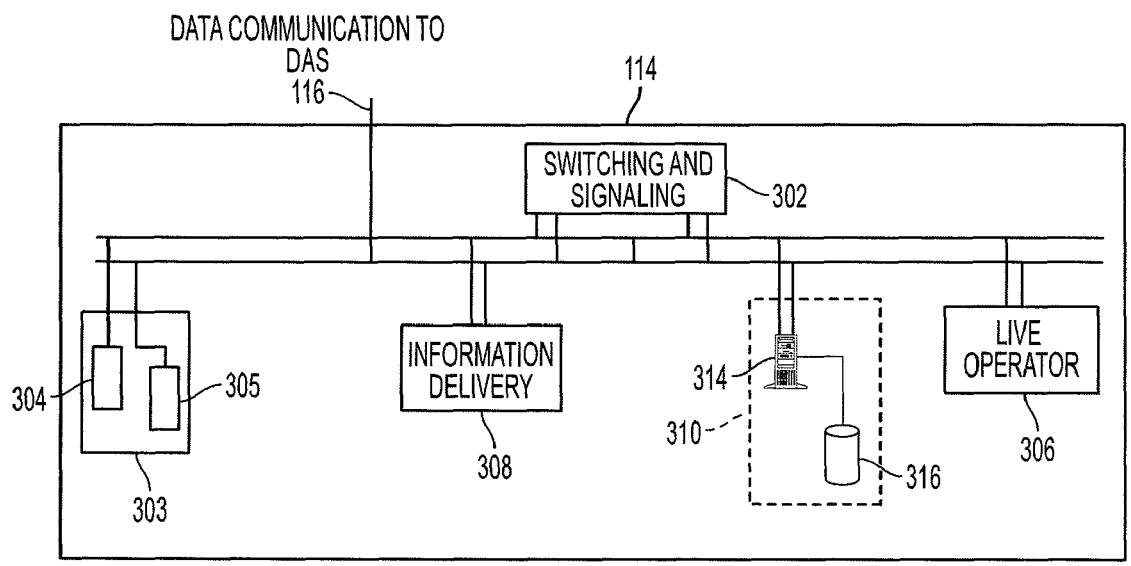
FIG. 3 is a block diagram illustrating a chargeable operator-service system.

FIG. 3 is a block diagram of the chargeable operator service system (OSS) 114. The chargeable OSS 114 includes a switching and signaling component 302, which may include, for example, a switch. The switching and signaling component 302 is provided to interact with the caller 102, 104, 106, 108 over a telephonic connection. The switching and signaling component 302 is further adapted to communicate over, for example, a packet-switched network with systems such as, for example, the free DAS 112. The chargeable OSS 114 also includes automation circuitry 303. The automation circuitry 303 includes a plurality of servers 304, 305. The automation circuitry 303 is adapted to automate the transferred directory-assistance call and prompt the caller 102, 104, 106, 108 for the listing request. The automation circuitry 303 recognizes the listing request from the caller 102, 104, 106, 108 using, for example, a speech recognition system 305. The speech recognition system 305 recognizes and interprets spoken language from caller 102, 104, 106, 108. In a typical embodiment, the speech recognition system 305 may be implemented as a server running the WINDOWS XP operating system from Microsoft Corporation or other suitable operating systems such as, for example, Unix, Linux, and the like. The speech recognition system 305 may also include special hardware, as known in the art, for assisting in recognizing speech patterns. The speech recognition system 305 may also execute one or more programs specifically designed to implement various functions of embodiments of the present invention. Such programs may be written in any standard programming language such as, for example, C or C++.

The automation circuitry 303 is further adapted to determine if automated directory assistance is appropriate for the transferred directory-assistance call or whether the transferred directory assistance call should be handled by a directory-assistance operator 306. The directory-assistance operator 306 is typically a live human operator assigned to the call. When the telephone number corresponding to the listing request is determined, the directory-assistance call is transferred to an information delivery component 308. The information delivery component 308 is adapted to provide the telephone number corresponding to the listing request to the caller 102, 104, 106, 108.

The chargeable OSS 114 also includes a caller data circuitry (CDC) 310. The CDC 310 includes at least one server 314 and at least one database 316. The at least one database 316 is adapted to store profiles and preferences for each caller 102, 104, 106, 108. The profiles and preferences associated with the callers 102, 104, 106, 108 are updated every time the caller 102, 104, 106, 108 places a call requesting directory-assistance. The preferences may be, for example, permission granted by the caller 102, 104, 106, 108 to automatically redirect a directory-assistance call between the free DAS 112 and the chargeable OSS 114 without permission from the caller 102, 104, 106, 108 every time the free DAS 112 is unable to recognize the listing request. In various embodiments, the database 316 may be implemented using, for example, Oracle™, MS Access™ databases, MS SQL, IBM DB2, and the like. For exemplary purposes, only one server 314 and one database 316 are shown; however, any number of servers and databases may be present within the CDC 310 as needed. In some embodiments, the profiles and preferences for each caller 102, 104, 106, 108 may be stored within the free DAS 112. The chargeable OSS 114 further includes a data link 116 forming a communications path between the free DAS 112 and the chargeable OSS 114. The data link 116 is adapted to pass data between the free DAS 112 and the chargeable OSS 114 regarding the directory-assistance call.

Figure 4A:
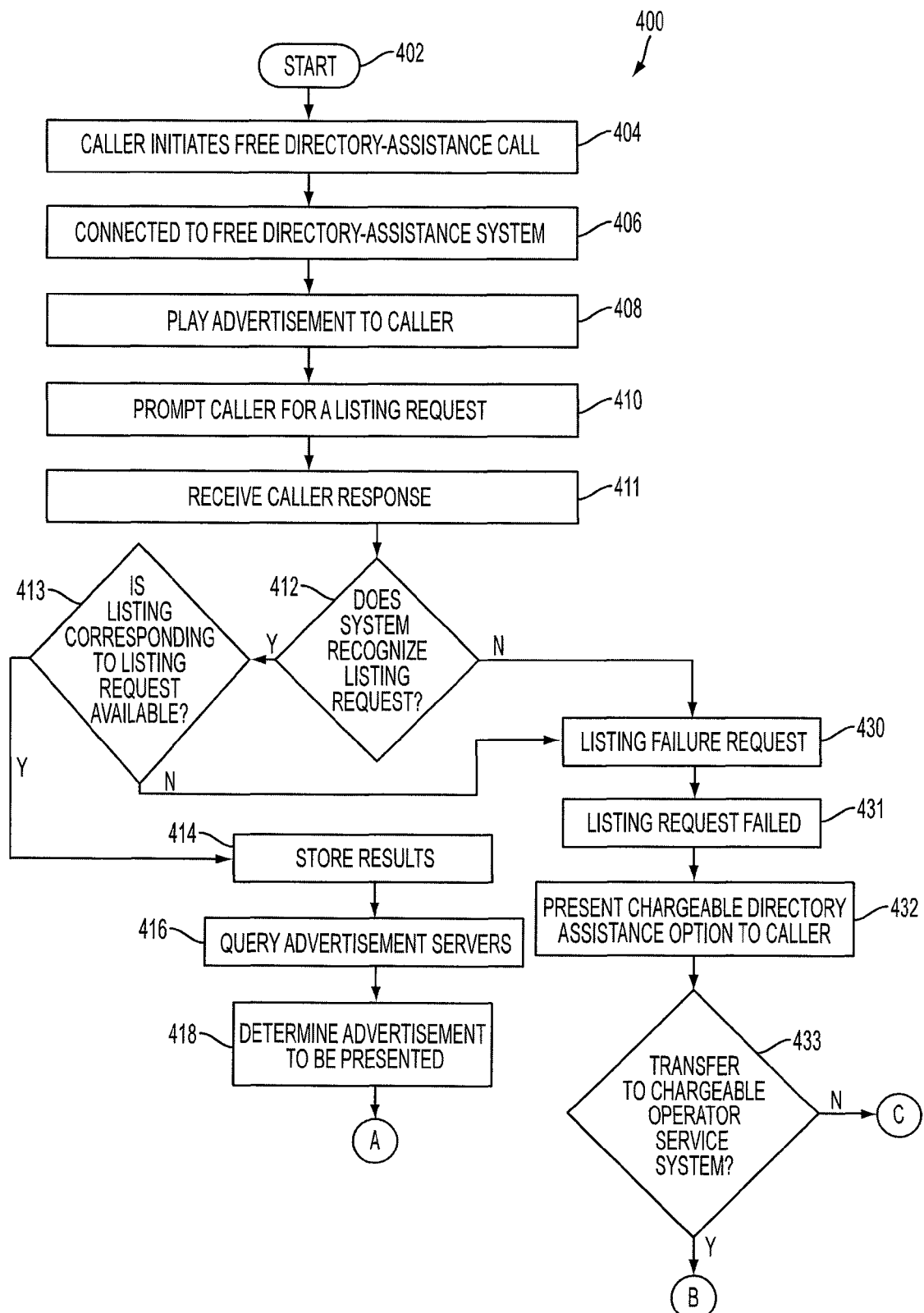
FIGS. 4A-B illustrate a flow diagram of a directory-assistance-based redirecting process.
Figure 4B:
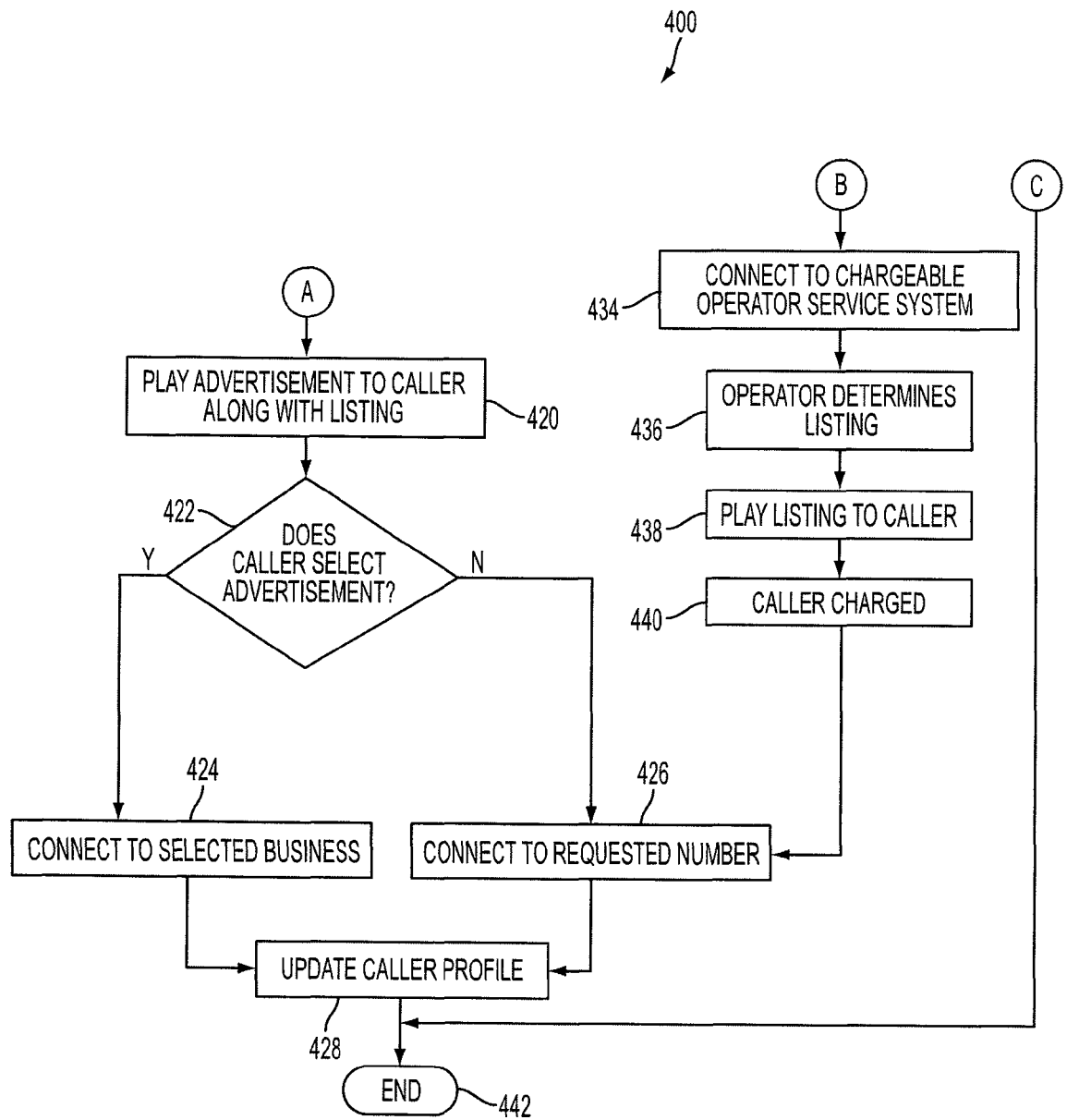

FIGS. 4A-B illustrate a flow diagram of a directory-assistance based redirecting process 400. For illustrative purposes, the process 400 will be described in conjunction with FIGS. 1-3. The process 400 starts at step 402. At step 404, a caller associated with one of the communication devices 102, 104, 106, 108 places a call requesting information to the free directory-assistance system (DAS) 112. For example, the caller 102, 104, 106, 108 may reach the free DAS 112 by dialing a specific phone number such as, for example, 1-800-CALLERS. At step 406, the caller 102, 104, 106, 108 is connected to the free DAS 112. At step 408, marketing information is provided to the caller 102, 104, 106, 108. The marketing information may be, for example, at least one advertisement. The at least one advertisement may be, for example, a recorded announcement of an audible or visual nature. The at least one advertisement presented to the caller 102, 104, 106, 108 is often selected randomly from a plurality of advertisements stored, for example, at the advertisement servers 226 and 228.

At step 410, the voice feature node (VFN) 214 prompts the caller 102, 104, 106, 108 for a listing request. In some embodiments, the VFN 214 utilizes a speech recognition system 224 to recognize the listing request from the caller 102, 104, 106, 108. In a typical embodiment, the speech recognition system 224 may not be integrated into the VFN 214. In other embodiments, the speech recognition system 224 may be integrated into the VFN 214. The speech recognition system 224 recognizes and interprets spoken language from the caller 102, 104, 106, 108. At step 411, a response from the caller is received. At step 412, it is determined whether the speech recognition system 224 has recognized the listing request from the caller 102, 104, 106, 108.

If it is determined at step 412 that the speech recognition system 224 has recognized the listing request, the process 400 proceeds to step 413. At step 413, it is determined if a listing corresponding to the listing request is available. If it is determined at step 413 that the listing corresponding to the listing request is available, the process 400 proceeds to step 414. In a typical embodiment, the listing may be, for example, a specific wireline or wireless telephone number and/or address of a residence or business. At step 414, the listing corresponding to the listing request is stored. At step 416, the VFN 214 launches a query to the advertisement servers 226, 228 to select at least one advertisement most relevant to the caller 102, 104, 106, 108 by accessing a profile of the caller 102, 104, 106, 108 stored within the at least one database 242. At step 418, at least one advertisement most relevant to the caller 102, 104, 106, 108 is selected in order to be presented to the caller 102, 104, 106, 108. The advertisement servers 226, 228 store a plurality of advertisements that may be presented to the caller 102, 104, 106, 108. The type of advertisements can be controlled to a highly specific degree. For example, if a caller 102, 104, 106, 108 places a call to the free DAS 112 and is interested in obtaining the number for a pizza restaurant, a plurality of advertisement for pizza specials in the caller's locality may be presented.

At step 420, the at least one selected advertisement is presented to the caller 102, 104, 106, 108 along with the listing. In some embodiments, the listing may be presented to the caller 102, 104, 106, 108 via, for example, a recorded announcement, a text message, an e-mail message, or any other suitable means. At step 422, it is determined if the caller 102, 104, 106, 108 has selected the at least one advertisement presented to the caller 102, 104, 106, 108.

If it is determined at step 422 that the caller 102, 104, 106, 108 has not selected at least one of the at least one advertisement, the process 400 proceeds to step 426. At step 426, the caller 102, 104, 106, 108 is connected to the initially requested number. However, if it is determined at step 422 that the caller 102, 104, 106, 108 has selected at least one of the at least one advertisement presented, the caller 102, 104, 106, 108 is connected at step 424, for example, to the business running the at least one selected advertisement. The process 400 proceeds from steps 424 and 426 to step 428. At step 428, the caller profile is updated and the process ends at step 442.

If it is determined at step 412 that the speech recognition system 224 has failed to recognize the listing request, the process 400 proceeds to step 430. The process 400 proceeds from step 430 to step 431. If it is determined at step 413 that the listing corresponding to the listing request is unavailable, the process 400 proceeds to step 430. At step 430, the listing corresponding to the listing request is deemed to have failed. In a typical embodiment, the listing request failure may be, for example, due to the speech recognition system 224 having failed to recognize the listing request and/or the listing being unavailable.

At step 431, the caller 102, 104, 106, 108 is informed that the listing request has failed. At step 432, the caller 102, 104, 106, 108 is asked whether the caller 102, 104, 106, 108 is interested in being transferred to a chargeable operator service system (OSS) 114. At step 433, it is determined whether the caller 102, 104, 106, 108 has opted to be transferred to the chargeable OSS 114. If it is determined at step 433 that the caller 102, 104, 106, 108 has not opted to be transferred to the chargeable OSS 114, the process 400 ends at step 442. However, if it is determined at step 433 that the caller 102, 104, 106, 108 has opted to be transferred to the chargeable OSS 114, the process 400 proceeds to step 434.

In a typical embodiment, the caller 102, 104, 106, 108 may opt or decline transfer to the chargeable OSS 114 via, for example, keying a known DTMF sequence of digits, saying a key-word, answering to a prompt, or any other suitable means.

At step 434, the caller 102, 104, 106, 108 is connected to the chargeable OSS 114. At step 436, a live directory-assistance operator determines the listing corresponding to the listing request. At step 438, the listing corresponding to the listing request is presented to the caller 102, 104, 106, 108 and the process 400 proceeds to step 440. At step 440, the caller 102, 104, 106, 108 is charged a fee for using the chargeable OSS 114. In a typical embodiment, the charges for utilizing the chargeable OSS 114 are initiated by the telecommunications network at a standard billing rate. According to some embodiments, the directory-assistance based redirecting system 100 rather than the telecommunications network generates a billing record or debits a caller's account to charge for the directory-assistance call.

From step 440, the process 400 proceeds to step 426, at which step the caller 102, 104, 106, 108 is connected to a number corresponding to the listing request. The process 400 proceeds from step 426 to step 428. At step 428, the caller profile is updated and the process ends at step 442.

Figure 5A:
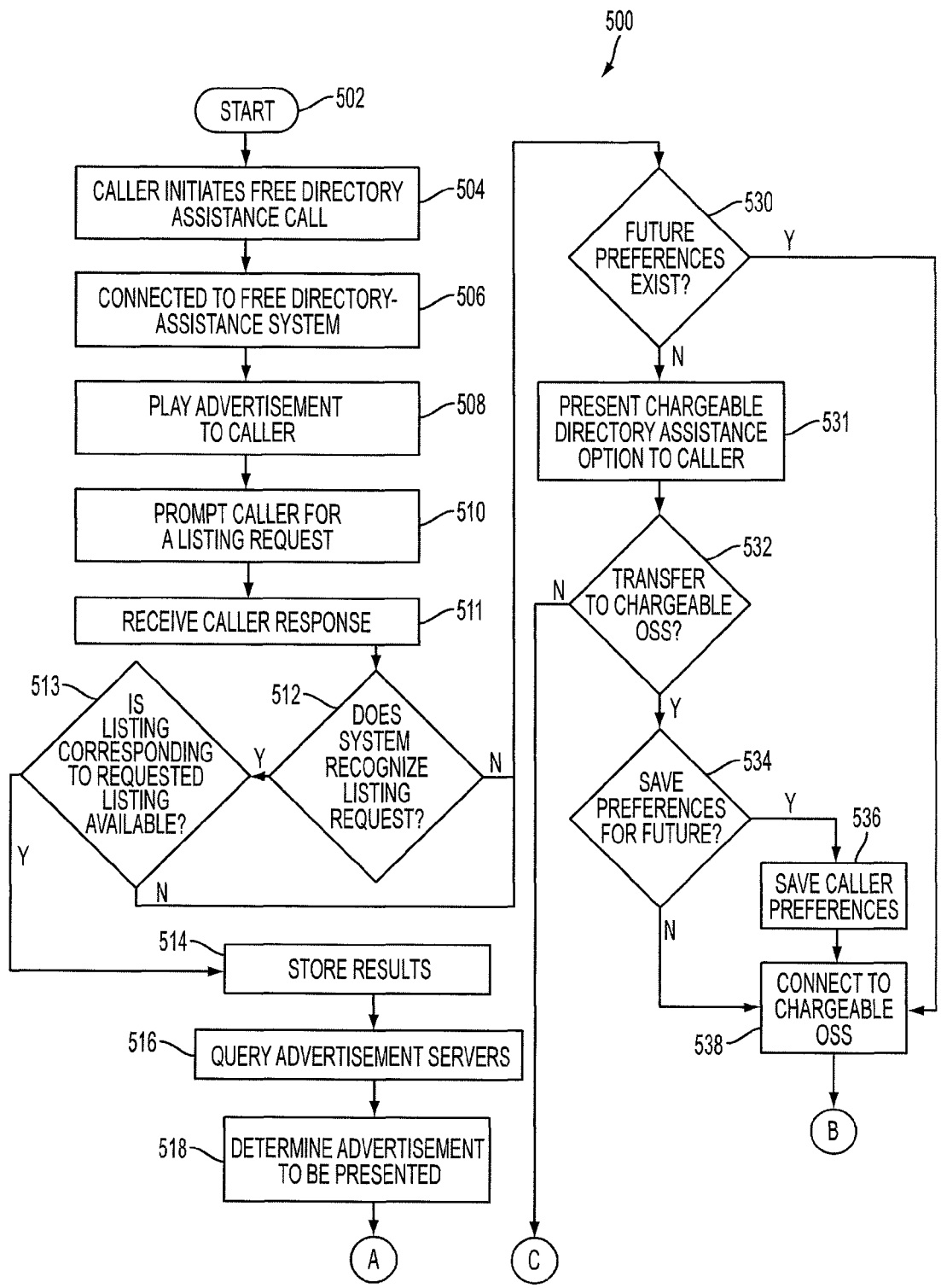
FIGS. 5A-B illustrate a flow diagram of a directory-assistance-based redirecting process.
Figure 5B:
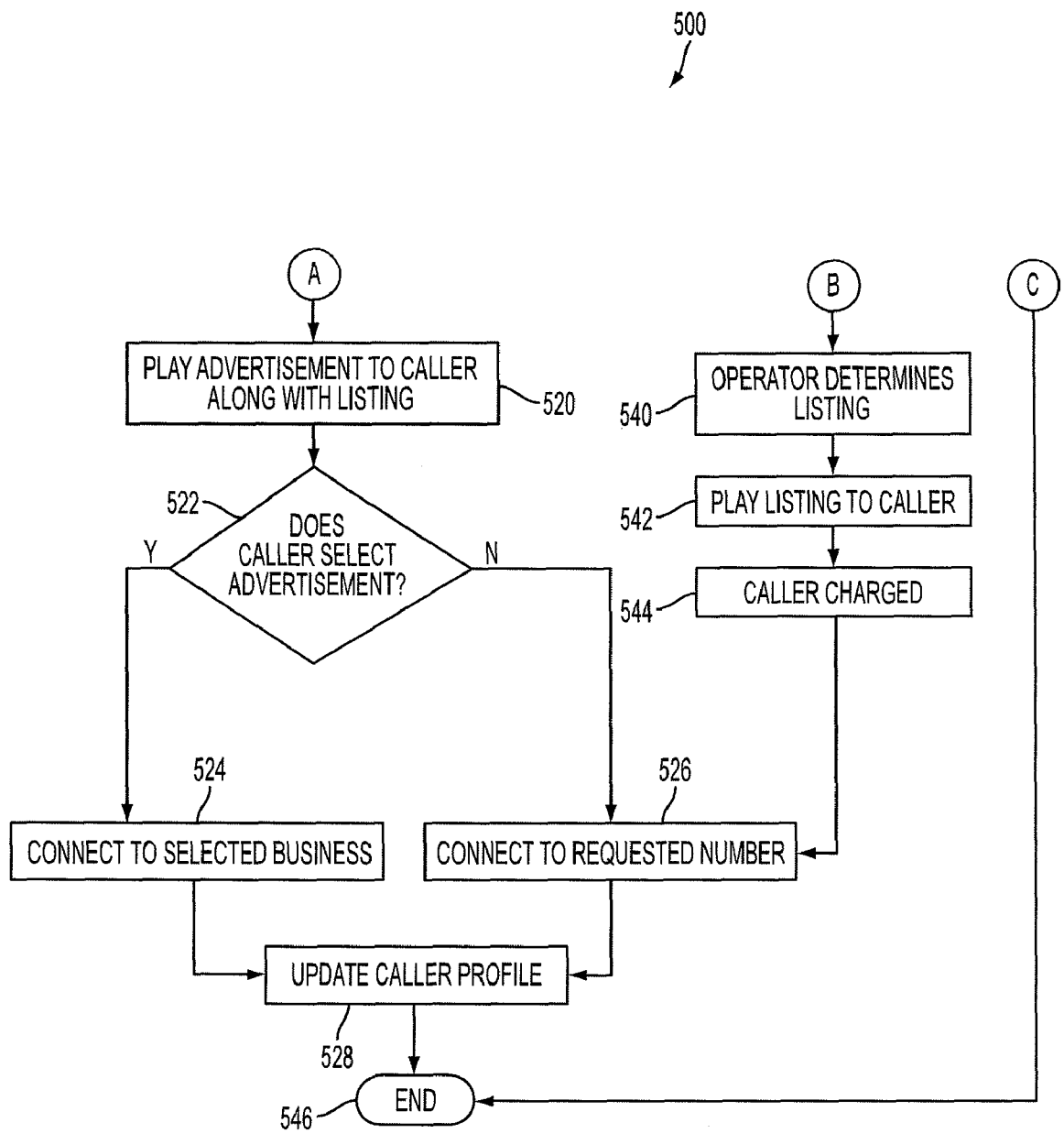

FIGS. 5A-B illustrate a flow diagram of a directory-assistance based redirecting process 500. For illustrative purposes, the process 500 will be described in conjunction with FIGS. 1-3. The process 500 starts at step 502. At step 504, a caller associated with one of the communication devices 102, 104, 106, 108 places a call requesting information to the free directory-assistance system (DAS) 112. For example, the caller 102, 104, 106, 108 may reach the free DAS 112 by dialing a specific phone number such as, for example, 1-800-CALLERS. At step 506, the caller 102, 104, 106, 108 is connected to the free DAS 112. At step 508, marketing information is provided to the caller 102, 104, 106, 108. The marketing information may be, for example, at least one advertisement. The at least one advertisement may be, for example, a recorded announcement of an audible or visual nature. The at least one advertisement presented to the caller 102, 104, 106, 108 is often selected randomly from a plurality of advertisements stored at the advertisement servers 226 and 228.

At step 510, the voice feature node (VFN) 214 prompts the caller 102, 104, 106, 108 for a listing request. In some embodiments, the VFN 214 utilizes a speech recognition system 224 to recognize the listing request from the caller 102, 104, 106, 108. The speech recognition system 224 recognizes and interprets spoken language from the caller 102, 104, 106, 108. At step 511, a response from the caller is received. At step 512, it is determined whether the speech recognition system 224 has recognized the listing request from the caller 102, 104, 106, 108.

If it is determined at step 512 that the speech recognition system 224 has recognized the listing request, the process 500 proceeds to step 513. At step 513, it is determined if a listing corresponding to the listing request is available. If it is determined at step 513 that the listing corresponding to the listing request is available, the process 500 proceeds to step 514. In a typical embodiment, the listing may be, for example, a specific wireline or wireless telephone number and/or address of a residence or business. At step 514, the listing corresponding to the listing request is stored. At step 516, the VFN 214 launches a query to the advertisement servers 226, 228 to select at least one advertisement most relevant to the caller 102, 104, 106, 108 by accessing a profile of the caller 102, 104, 106, 108 stored within the at least one database 242. At step 518, at least one advertisement most relevant to the caller 102, 104, 106, 108 is selected in order to be presented to the caller 102, 104, 106, 108. The advertisement servers 226, 228 store a plurality of advertisements that may be presented to the caller 102, 104, 106, 108. The type of advertisements can be controlled to a highly specific degree. For example, if a caller 102, 104, 106, 108 places a call to the free DAS 112 and is interested in obtaining the number for a pizza restaurant, a plurality of advertisement for pizza specials in the caller's locality may be presented.

At step 520, the at least one selected advertisement is presented to the caller 102, 104, 106, 108 along with the listing. In some embodiments, the listing may be presented to the caller 102, 104, 106, 108 via, for example, a recorded announcement, a text message, an e-mail message, or any other suitable means. At step 522, it is determined if the caller 102, 104, 106, 108 has selected the at least one advertisement presented to the caller 102, 104, 106, 108.

If it is determined at step 522 that the caller 102, 104, 106, 108 has not selected at least one of the at least one advertisement, the process 500 proceeds to step 526. At step 526, the caller 102, 104, 106, 108 is connected to the initially requested number. However, if it is determined at step 522 that the caller 102, 104, 106, 108 has selected at least one of the at least one advertisement presented, the caller 102, 104, 106, 108 is connected at step 524, for example, to the business running the at least one selected advertisement. The process 500 proceeds from steps 524 and 526 to step 528. At step 528, the caller profile is updated and the process ends at step 546. If it is determined at step 512 that the speech recognition system 224 has failed to recognize the listing request, the process 500 proceeds to step 530.

If it is determined at step 513 that the listing corresponding to the listing request is unavailable, the process 500 proceeds to step 530. At step 530, it is determined if future preferences for the caller 102, 104, 106, 108 exist within the CDC 310 of the chargeable OSS 114. The preferences may be, for example, permission granted by the caller 102, 104, 106, 108 in a previous directory-assistance call to automatically redirect a directory-assistance call between the free DAS 112 and the chargeable OSS 114 without permission from the caller 102, 104, 106, 108 every time the free DAS 112 is unable to recognize the listing request or if the listing corresponding to the listing request is unavailable. If it is determined at step 530 that future preferences for the caller 102, 104, 106, 108 exist, the process 500 proceeds to step 538. At step 538, the caller 102, 104, 106, 108 is connected to the chargeable OSS 114. At step 540, a live directory-assistance operator determines the listing corresponding to the listing request. At step 542, the listing corresponding to the listing request is presented to the caller 102, 104, 106, 108 and the process 500 proceeds to step 544. At step 544, the caller is charged a fee for using the chargeable OSS 114. In a typical embodiment, the charges for utilizing the chargeable OSS 114 are initiated by the telecommunications network at a standard billing rate. According to some embodiments, the directory-assistance based redirecting system 100 rather than the telecommunications network generates a billing record or debits a callers account to charge for the directory-assistance call.

From step 544, the process 500 proceeds to step 526, at which step the caller 102, 104, 106, 108 is connected to a number corresponding to the listing request. The process 500 proceeds from step 526 to step 528. At step 528, the caller profile is updated and the process ends at step 546.

However, if it is determined at step 530 that future preferences for the caller 102, 104, 106, 108 do not exist, the process 500 proceeds to step 531. At step 531, the caller 102, 104, 106, 108 is asked whether the caller 102, 104, 106, 108 is interested in being transferred to a chargeable operator service system (OSS) 114. At step 532, it is determined whether the caller 102, 104, 106, 108 has opted to be transferred to the chargeable OSS 114. If it is determined at step 532 that the caller 102, 104, 106, 108 has not opted to be transferred to the chargeable OSS 114, the process 500 ends at step 546. However, if it is determined at step 532 that the caller 102, 104, 106, 108 has opted to be transferred to the chargeable OSS 114, the process 500 proceeds to step 534.

In a typical embodiment, the caller 102, 104, 106, 108 may opt or decline transfer to the chargeable OSS 114 via, for example, keying a known DTMF sequence of digits, saying a key-word, answering to a prompt, or any other suitable means.

At step 534, it is determined if the caller 102, 104, 106, 108 has opted to store preferences for the future. The preferences may be, for example, permission granted by the caller 102, 104, 106, 108 to automatically redirect a directory-assistance call between the free DAS 112 and the chargeable OSS 114 without permission from the caller 102, 104, 106, 108 every time the free DAS 112 is unable to recognize the listing request or the if the listing is unavailable. If it is determined at step 534 that the caller 102, 104, 106, 108 gives permission to store preferences for future directory-assistance calls, the process proceed to step 536. At step 536, caller preferences are stored for future directory-assistance calls and the process 500 proceeds to step 538. However, if it is determined at step 534 that the caller 102, 104, 106, 108 declines permission to store preferences for future directory-assistance calls, the process proceed to step 538.

At step 538, the caller 102, 104, 106, 108 is connected to the chargeable OSS 114. At step 540, a live directory-assistance operator determines the listing corresponding to the listing request. At step 542, the listing corresponding to the listing request is presented to the caller 102, 104, 106, 108 and the process 500 proceeds to step 544. At step 544, the caller is charged a fee for using the chargeable OSS 114. In a typical embodiment, the charges for utilizing the chargeable OSS 114 are initiated by the telecommunications network at a standard billing rate. According to some embodiments, the directory-assistance based redirecting system 100 rather than the telecommunications network generates a billing record or debits the caller's account to charge for the directory-assistance call.

From step 544, the process 500 proceeds to step 526, at which step the caller 102, 104, 106, 108 is connected to a number corresponding to the listing request. The process 500 proceeds from step 526 to step 528. At step 528, the caller profile is updated and the process ends at step 546.

Figure 6A:
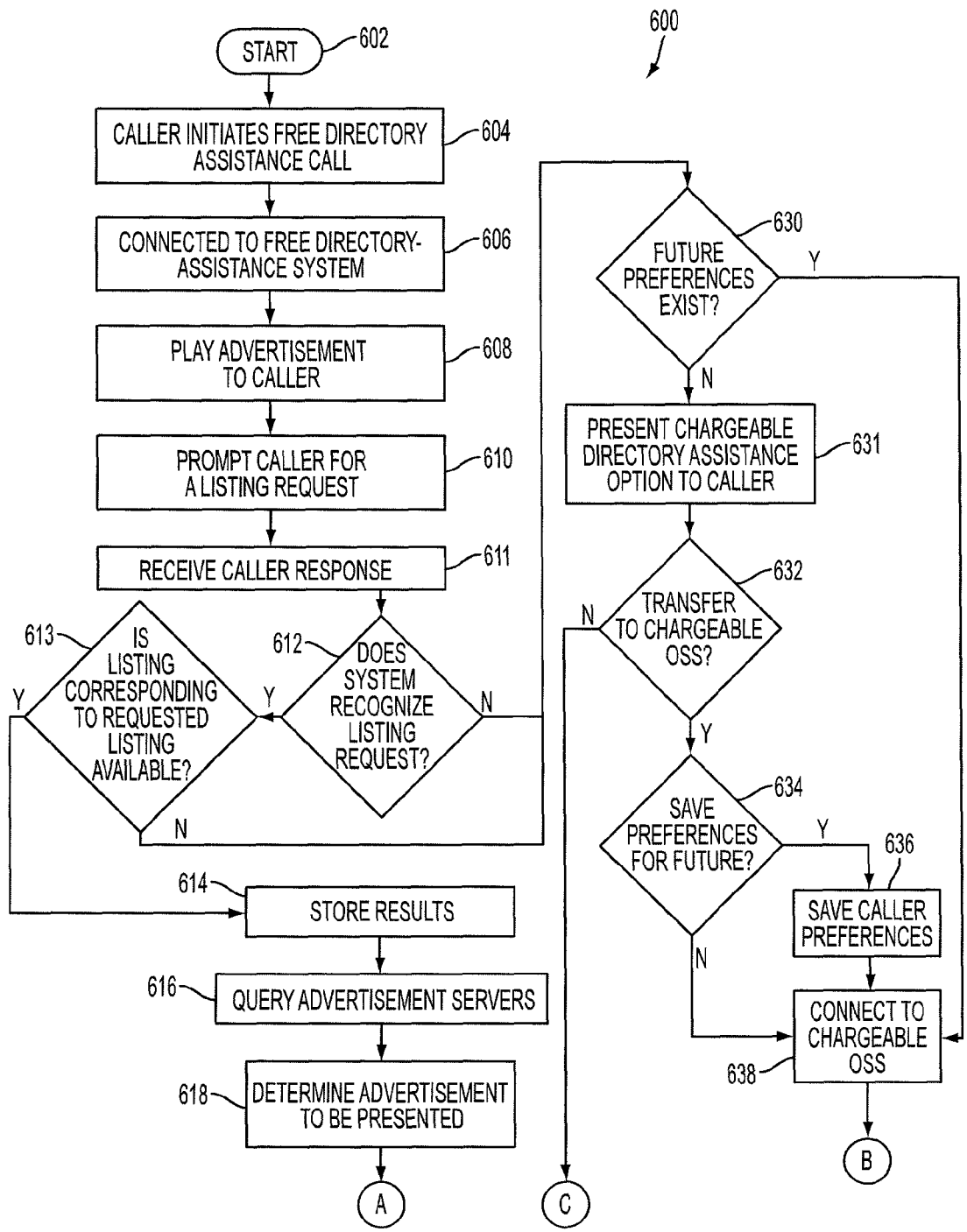
FIGS. 6A-B illustrate a flow diagram of a directory-assistance-based redirecting process.
Figure 6B:
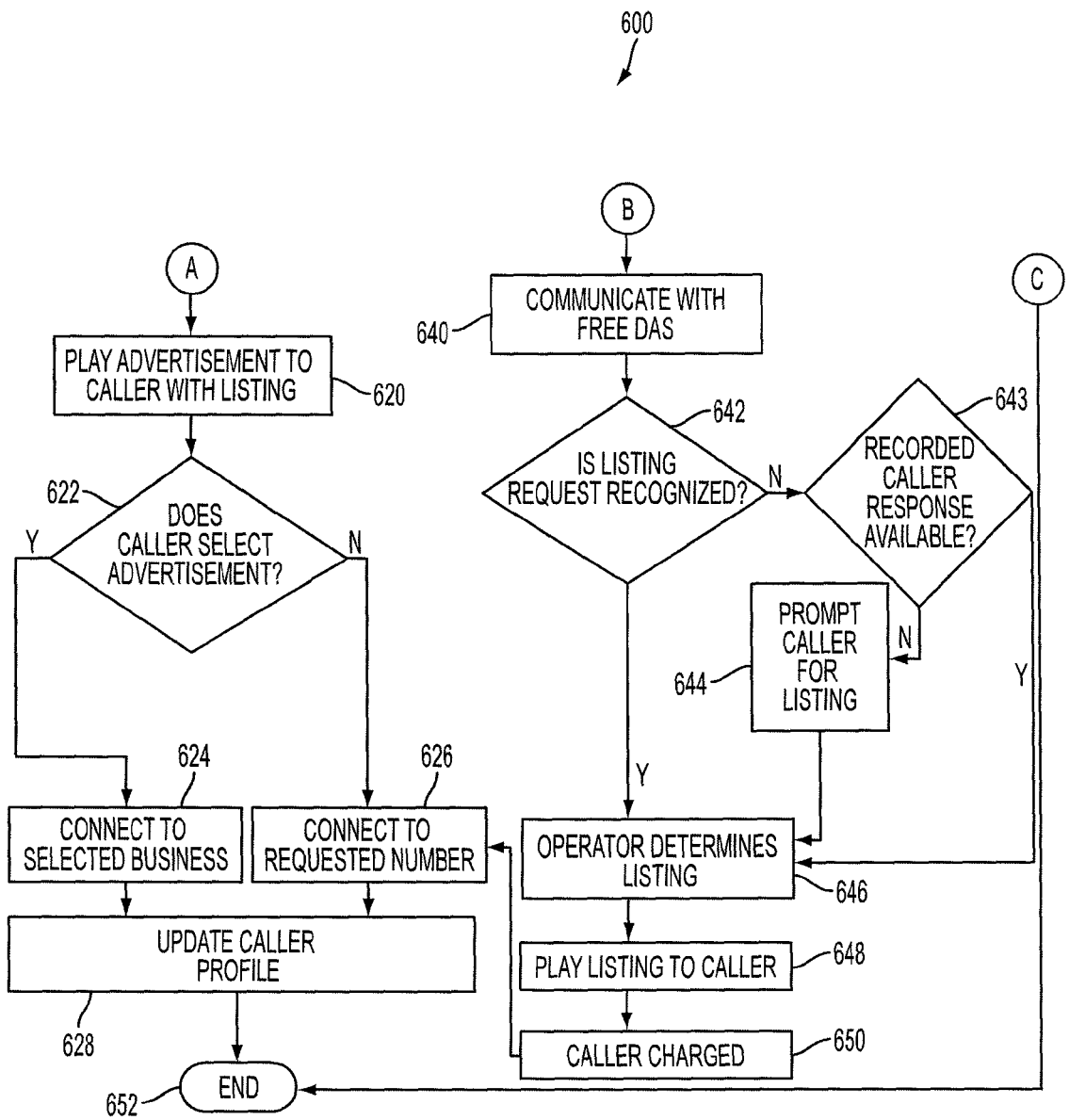

FIGS. 6A-B illustrate a flow diagram of a directory-assistance based redirecting process 600. For illustrative purposes, the process 600 will be described in conjunction with FIGS. 1-3. The process 600 starts at step 602. At step 604, a caller associated with one of the communication devices 102, 104, 106, 108 places a call requesting information to the free directory-assistance system (DAS) 112. For example, the caller 102, 104, 106, 108 may reach the free DAS 112 by dialing a specific phone number such as, for example, 1-800-CALLERS. At step 606, the caller 102, 104, 106, 108 is connected to the free DAS 112. At step 608, marketing information is provided to the caller 102, 104, 106, 108. The marketing information may be, for example, at least one advertisement. The at least one advertisement may be, for example, a recorded announcement of an aural or visual nature. The at least one advertisement presented to the caller 102, 104, 106, 108 is often selected randomly from a plurality of advertisements stored at the advertisement servers 226 and 228.

At step 610, the voice feature node (VFN) 214 prompts the caller 102, 104, 106, 108 for a listing request. In some embodiments, the VFN 214 utilizes a speech recognition system 224 to recognize the listing request from the caller 102, 104, 106, 108. The speech recognition system 224 recognizes and interprets spoken language from the caller 102, 104, 106, 108. At step 611, a response from the caller is received. At step 612, it is determined whether the speech recognition system 224 has recognized the listing request from the caller 102, 104, 106, 108.

If it is determined at step 612 that the speech recognition system 224 has recognized the listing request, the process 600 proceeds to step 613. At step 613, it is determined if a listing corresponding to the listing request is available. If it is determined at step 613 that the listing corresponding to the listing request is available, the process 600 proceeds to step 614. In a typical embodiment, the listing may be, for example, a specific wireline or wireless telephone number and/or address of a residence or business. At step 614, the listing corresponding to the listing request is stored. At step 616, the VFN 214 launches a query to the advertisement servers 226, 228 to select at least one advertisement most relevant to the caller 102, 104, 106, 108 by accessing a profile of the caller 102, 104, 106, 108 stored within the at least one database 242. At step 618, at least one advertisement most relevant to the caller 102, 104, 106, 108 is selected in order to be presented to the caller 102, 104, 106, 108. The advertisement servers 226, 228 store a plurality of advertisements that may be presented to the caller 102, 104, 106, 108. The type of advertisements can be controlled to a highly specific degree. For example, if a caller 102, 104, 106, 108 places a call to the free DAS 112 and is interested in obtaining the number for a pizza restaurant, a plurality of advertisement for pizza specials in the caller's locality may be presented.

At step 620, the at least one selected advertisement is presented to the caller 102, 104, 106, 108 along with the listing. In some embodiments, the listing may be presented to the caller 102, 104, 106, 108 via, for example, a recorded announcement, a text message, an e-mail message, or any other suitable means. At step 622, it is determined if the caller 102, 104, 106, 108 has selected the at least one advertisement presented to the caller 102, 104, 106, 108.

If it is determined at step 622 that the caller 102, 104, 106, 108 has not selected at least one of the at least one advertisement, the process 600 proceeds to step 626. At step 626, the caller 102, 104, 106, 108 is connected to number corresponding to the listing request. However, if it is determined at step 622 that the caller 102, 104, 106, 108 has selected at least one of the at least one advertisement presented, the caller 102, 104, 106, 108 is connected at step 624, for example, to the business running the at least one selected advertisement. The process 600 proceeds from steps 624 and 626 to step 628. At step 628, the caller profile is updated and the process ends at step 652.

If it is determined at step 612 that the speech recognition system 224 has failed to recognize the listing request, the process 600 proceeds to step 630. If it is determined at step 613 that the listing corresponding to the listing request is unavailable, the process 600 proceeds to step 630. At step 630, it is determined if future preferences for the caller 102, 104, 106, 108 exist within the CDC 310 of the chargeable OSS 114. The preferences may be, for example, permission granted by the caller 102, 104, 106, 108 in a previous directory-assistance call to automatically redirect a directory-assistance call between the free DAS 112 and the chargeable OSS 114 without permission from the caller 102, 104, 106, 108 every time the free DAS 112 is unable to recognize the listing request or if the listing corresponding to the listing request is unavailable. If it is determined at step 630 that future preferences for the caller 102, 104, 106, 108 exist, the process 600 proceeds to step 638. At step 638, the caller 102, 104, 106, 108 is connected to the chargeable OSS 114. At step 640, automation circuitry 303 of the chargeable OSS 114 communicates with the VFN 214 of the free DAS 112 to obtain the listing request information as provided by the VFN 214.

At step 642, it is determined if the listing request obtained from the VFN 214 is recognized. If it is determined at step 642 that the listing request obtained from the VFN 214 is not recognized, the process 600 proceeds to step 643. At step 643, the automation circuitry 303 of the chargeable OSS 114 determines if a recorded caller's listing request response is available. If it is determined at step 643 that no recorded caller response is available, the process 600 proceeds to step 644. At step 644, the automation circuitry 303 of the chargeable OSS 114 prompts the caller 102, 104, 106, 108 for a listing request and the process 600 proceeds to step 646. If it is determined at step 643 that the recorded caller response obtained from the VFN 214 is available, the process 600 proceeds to step 646. At step 646, a live directory-assistance operator determines the listing corresponding to the listing request and the process 600 proceeds to step 648.

However, if it is determined at step 642 that the listing request information obtained from the VFN 214 is recognized, the process 600 proceeds to step 646. At step 646, the live directory-assistance operator determines the listing request and the process 600 proceeds to step 648. At step 648, the listing corresponding to the listing request is presented to the caller 102, 104, 106, 108 and the process 600 proceeds to step 650. At step 650, the caller is charged a fee for using the chargeable OSS 114. In a typical embodiment, the charges for utilizing the chargeable OSS 114 are initiated by the telecommunications network at a standard billing rate. According to some embodiments, the directory-assistance based redirecting system 100 rather than the telecommunications network generates a billing record or debits the caller's account to charge for the directory-assistance call.

From step 650, the process 600 proceeds to step 626, at which step the caller 102, 104, 106, 108 is connected to a number corresponding to the listing request. The process 600 proceeds from step 626 to step 628. At step 628, the caller profile is updated and the process ends at step 652.

However, if it is determined at step 630 that future preferences for the caller 102, 104, 106, 108 do not exist, the process 600 proceeds to step 631. At step 631, the caller 102, 104, 106, 108 is asked whether the caller 102, 104, 106, 108 is interested in being transferred to a chargeable operator service system (OSS) 114. At step 632, it is determined whether the caller 102, 104, 106, 108 has opted to be transferred to the chargeable OSS 114. If it is determined at step 632 that the caller 102, 104, 106, 108 has not opted to be transferred to the chargeable OSS 114, the process 600 ends at step 652. However, if it is determined at step 632 that the caller 102, 104, 106, 108 has opted to be transferred to the chargeable OSS 114, the process 600 proceeds to step 634.

In a typical embodiment, the caller 102, 104, 106, 108 may opt or decline transfer to the chargeable OSS 114 via, for example, keying a known DTMF sequence of digits, saying a key-word, answering to a prompt, or any other suitable means.

At step 634, it is determined if the caller 102, 104, 106, 108 has opted to store preferences for the future. The preferences may be, for example, permission granted by the caller 102, 104, 106, 108 to automatically redirect a directory-assistance call between the free DAS 112 to the chargeable OSS 114 without asking the caller 102, 104, 106, 108 for permission every time the free DAS 112 is unable to recognize the listing request or if the listing corresponding to the listing request is unavailable. If it is determined at step 634 that the caller 102, 104, 106, 108 gives permission to store preferences for future directory-assistance calls, the process proceed to step 636. At step 636, caller preferences are stored for future directory-assistance calls and the process 600 proceeds to step 638. However, if it is determined at step 634 that the caller 102, 104, 106, 108 declines permission to store preferences for future directory-assistance calls, the process proceed to step 638.

At step 638, the caller 102, 104, 106, 108 is connected to the chargeable OSS 114. At step 640, automation circuitry 303 of the chargeable OSS 114 communicates with the VFN 214 of the free DAS 112 to obtain the listing request information as provided by the VFN 214. At step 642, it is determined if the listing request obtained from the VFN 214 is recognized. If it is determined at step 642 that the listing request obtained from the VFN 214 is not recognized, the process 600 proceeds to step 643. At step 643, the automation circuitry 303 of the chargeable OSS 114 determines if a recorded caller's listing request response is available. If it is determined at step 643 that no recorded caller response is available, the process 600 proceeds to step 644. At step 644, the automation circuitry 303 of the chargeable OSS 114 prompts the caller 102, 104, 106, 108 for a listing request and the process 600 proceeds to step 646. If it is determined at step 643 that the recorded caller response obtained from the VFN 214 is available, the process 600 proceeds to step 646. At step 646, a live directory-assistance operator determines the listing corresponding to the listing request and the process 600 proceeds to step 648.

However, if it is determined at step 642 that the listing request obtained from the VFN 214 is recognized, the process 600 proceeds to step 646. At step 646, the live directory-assistance operator determines the listing request and the process 600 proceeds to step 648. At step 648, the listing corresponding to the listing request is presented to the caller 102, 104, 106, 108 and the process 600 proceeds to step 650. At step 650, the caller is charged a fee for using the chargeable OSS 114. In a typical embodiment, the charges for utilizing the chargeable OSS 114 are initiated by the telecommunications network at a standard billing rate. According to some embodiments, the directory-assistance based redirecting system 100 rather than the telecommunications network generates a billing record or debits the caller's account to charge for the directory-assistance call.

From step 650, the process 600 proceeds to step 626, at which step the caller 102, 104, 106, 108 is connected to a number corresponding to the listing request. The process 600 proceeds from step 626 to step 628. At step 628, the caller profile is updated and the process ends at step 652.

It should be noted that the term "directory-assistance" refers to a phone service used to determine a specific wireline or wireless telephone number and/or address of a residence or business. The term "directory-assistance call" refers to a call made to determine a specific wireline or wireless telephone number and/or address of a residence or business. The directory-assistance call may come from, for example, a wireline telephone, a wireless (cellular) telephone, a VOIP (Internet) telephone, a Satellite telephone, or a personal computer. The term "listing" refers to a specific wireline or wireless telephone number and/or address of a residence or business.

Those having skill in the art will appreciate that the method and system as disclosed is not limited to directory-assistance calls and can be implemented on calls placed by callers requesting other information such as, for example, movie listings, movie times, insurance information, and the like. Principles of the invention may be applied to any automated system that permits callers to obtain information therefrom.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of redirecting a directory-assistance call, the method comprising:
   receiving a directory-assistance request from a caller;
   determining via a free directory-assistance service whether information corresponding to the directory-assistance request is available;
   responsive to a determination that the information is available, presenting, to the caller, the information free of charge to the caller;
   responsive to a determination that the information is not available, redirecting the directory-assistance call to a chargeable directory-assistance service;
   prior to the step of presenting the information free of charge to the caller, presenting to the caller at least one advertisement from a plurality of advertisements in an intelligent manner;
   wherein the step of presenting to the caller the at least one advertisement comprises:
      determining call attributes of the directory-assistance call;
      accessing, utilizing at least some of the call attributes, a profile of the caller;
      selecting at least one advertisement from the plurality of advertisements based, at least in part, on the profile of the caller; and
      presenting, to the caller, the at least one selected advertisement.

2. The method of claim 1, comprising charging the caller for utilizing the chargeable directory-assistance service.

3. The method of claim 2, comprising presenting, via the chargeable directory-assistance service, the information to the caller.

4. The method of claim 1, comprising, prior to the step of presenting, via the chargeable directory-assistance service, the information to the caller, forwarding at least a portion of the directory-assistance request to the chargeable directory-assistance service.

5. The method of claim 3, comprising, prior to the step of presenting, via the chargeable directory-assistance service, the information to the caller, the chargeable directory-assistance service requesting the caller to provide the directory-assistance request.

6. The method according to claim 1, comprising, responsive to a determination that the information is not available, presenting to the caller an option of accepting or denying redirection of the directory-assistance call to the chargeable directory-assistance service; and
   responsive to acceptance of the redirection, performing the redirecting step.

7. The method of claim 6, comprising, responsive to denial by the caller of the redirection, terminating the directory-assistance call.

8. The method of claim 1, wherein the directory-assistance request comprises a request for a listing.

9. The method of claim 8, wherein the listing is for a wireless telephone.

10. An article of manufacture for redirecting a directory-assistance call, the article of manufacture comprising:
    at least one computer readable medium;
    processor instructions contained on the at least one computer readable medium, the processor instructions configured to be readable from the at least one computer readable medium by at least one processor and thereby cause the at least one processor to operate as to perform the following steps:
       receiving a directory-assistance request from a caller;
       determining via a free directory-assistance service whether information corresponding to the directory-assistance request is available;
       responsive to a determination that the information is available, presenting, to the caller, the information free of charge to the caller;
       responsive to a determination that the information is not available, redirecting the directory-assistance call to a chargeable directory-assistance service
       prior to the step of presenting the information free of charge to the caller, presenting to the caller at least one advertisement from a plurality of advertisements in an intelligent manner;
       wherein the step of presenting to the caller the at least one advertisement comprises:
          determining call attributes of the directory-assistance call;
          accessing, utilizing at least some of the call attributes, a profile of the caller:
          selecting at least one advertisement from the plurality of advertisements based, at least in part, on the profile of the caller; and
          presenting, to the caller, the at least one selected advertisement.

11. The article of manufacture of claim 10, wherein the processor instructions are configured to cause the at least one processor to operate as to perform the following step:
    charging the caller for utilizing the chargeable operator directory-assistance service.

12. The article of manufacture of claim 11, wherein the processor instructions are configured to cause the at least one processor to operate as to perform the following step:
    presenting, via the chargeable directory-assistance service, the information to the caller.

13. The article of manufacture of claim 10, wherein the processor instructions are configured to cause the at least one processor to operate as to perform the following step:
    forwarding at least a portion of the directory-assistance request to the chargeable directory-assistance service prior to presenting, via the chargeable directory-assistance service, the information to the caller.

14. The article of manufacture of claim 12, wherein the processor instructions are configured to cause the at least one processor to operate as to perform the following step:
    requesting the caller to provide the directory-assistance request prior to presenting, via the chargeable directory-assistance service, the information to the caller.

15. The article of manufacture of claim 10, wherein the processor instructions are configured to cause the at least one processor to operate as to perform the following steps:

responsive to a determination that the information is not available, presenting to the caller an option of accepting or denying redirection of the directory-assistance call to the chargeable directory-assistance service; and responsive to acceptance of the redirection, performing the redirection.

16. The article of manufacture of claim 15, wherein the processor instructions are configured to cause the at least one processor to operate as to perform the following step:

terminating the directory-assistance call responsive to denial by the caller of the redirection.

17. The article of manufacture of claim 10, wherein the directory-assistance request comprises a request for a listing.

18. The article of manufacture of claim 17, wherein the listing is for a wireless telephone.

19. A directory-assistance call redirecting system comprising:

a free directory-assistance system adapted to determine whether information corresponding to a directory-assistance request is available and present, to the caller, the information free of charge to the caller responsive to a determination that the information is available;

a chargeable operator directory-assistance system interoperably coupled to the free directory-assistance system and adapted to present, to the caller, the information responsive to a determination by the free directory-assistance system that the information is not available;

wherein prior to presenting the information free of charge to the caller, the free directory-assistance system is adapted to:

determine call attributes of the directory-assistance call;

access, utilizing at least some of the call attributes, a profile of the caller;

select at least one advertisement from the plurality of advertisements based, at least in part, on the profile of the caller; and present, to the caller, the at least one selected advertisement.

20. The system according to claim 19, wherein the free directory-assistance system comprises:

a central processing unit (CPU) having a network interface;
a telephony interface adapted to interact with the caller;
a voice feature node (VFN) adapted to prompt the caller for a listing;
a caller-profile circuitry adapted to store the profiles for the caller;
a call screening circuitry (CSC) adapted to determine the call attributes; and
a plurality of advertisement servers adapted to store the plurality of advertisements.

21. The system according to claim 20, wherein the call attributes comprise a caller name, a caller phone number, a caller location, and a time of the directory-assistance call.

22. The system according to claim 19, wherein:

the free directory-assistance system is adapted to present, to the caller, an option of accepting or denying redirection of the directory-assistance call to the chargeable operator directory-assistance system responsive to a determination that the information is not available; and the free directory-assistance system is adapted to redirect the directory-assistance call to the chargeable operator directory-assistance system responsive to acceptance of the redirection.

23. The system according to claim 22, wherein the free directory-assistance system is adapted to terminate the directory-assistance call responsive to denial by the caller of the redirection.

24. The system according to claim 19, wherein the directory-assistance request comprises a request for a listing.

25. The system according to claim 24, wherein the listing is for a wireless telephone.

26. The system according to claim 19, wherein the chargeable operator directory-assistance system comprises:

a switching and signaling component adapted to interact with the caller;

an automation circuitry adapted to automate a transferred directory-assistance call and prompt the caller for a listing;

a call data circuitry (CDC) adapted to store preferences for the caller;

at least one directory-assistance operator; and a data link adapted to form a communications path between the free directory-assistance system and the chargeable operator directory-assistance system.

27. The system according to claim 26, wherein the preferences comprise permission granted by the caller to automatically redirect the directory-assistance call between the free directory-assistance system and the chargeable operator directory-assistance system.

28. The system according to claim 26, wherein the automation circuitry is further adapted to determine if automated directory assistance is appropriate or whether the directory assistance should be handled by the at least one directory-assistance operator.

29. The system according to claim 19, wherein the chargeable operator directory-assistance system is adapted to charge the caller for utilizing the chargeable operator directory-assistance system.

* * * * *